April 19, 1932.  J. F. HAAS  1,854,510
PORTABLE POWER DRIVEN SAW
Filed Nov. 6, 1929  2 Sheets-Sheet 1

Inventor
Joseph F. Haas
Attys

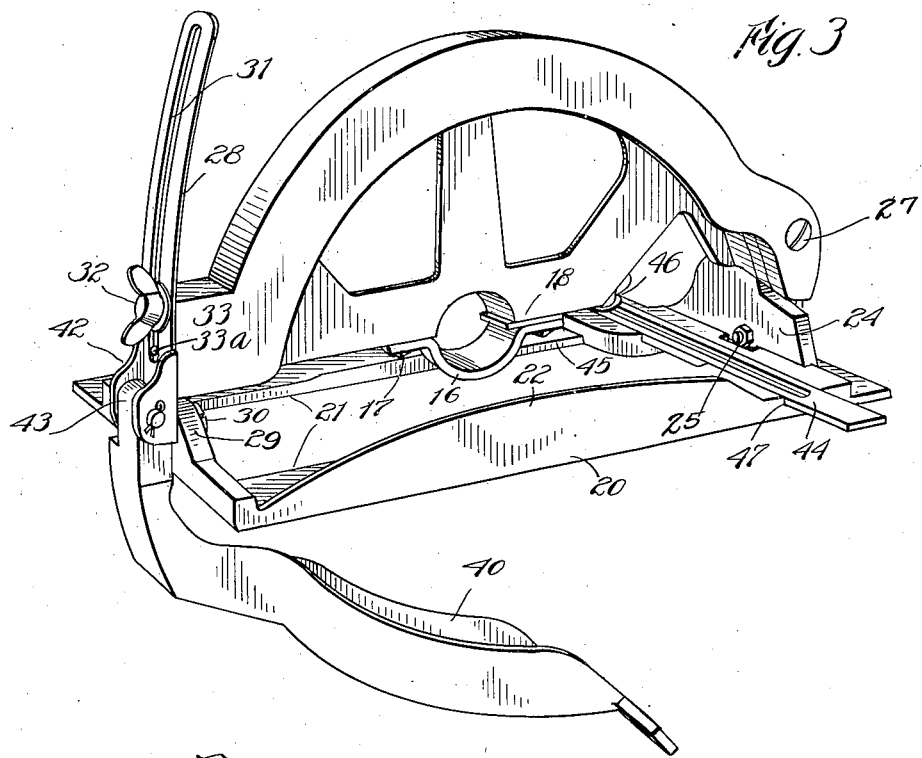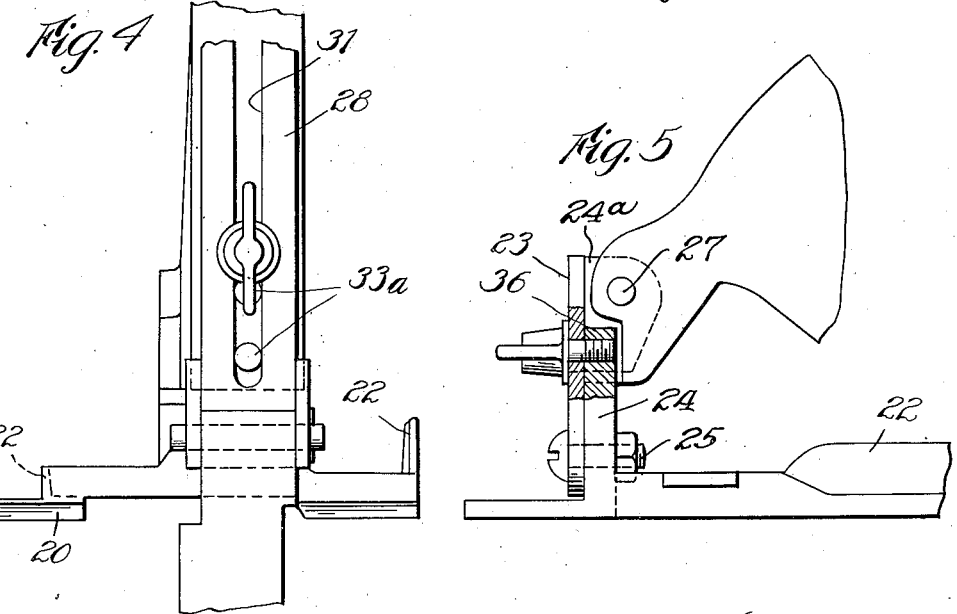

Patented Apr. 19, 1932

1,854,510

UNITED STATES PATENT OFFICE

JOSEPH F. HAAS, OF FOREST PARK, ILLINOIS, ASSIGNOR, BY MESNE ASSIGNMENTS, TO DE WALT PRODUCTS CORPORATION, OF LEOLA, PENNSYLVANIA, A CORPORATION OF PENNSYLVANIA

PORTABLE POWER DRIVEN SAW

Application filed November 6, 1929. Serial No. 405,102.

The invention relates to portable power driven saws and similar tools, and the general object of the invention is to provide a new and improved construction which permits of adjustment both for the purpose of varying the depth of cut and for the purpose of varying the angularity of the cut.

A further object of the invention is to provide a portable power driven saw or the like comprising a main guard frame providing a support for a circular saw blade and a guide rest through which the saw blade is adapted to extend, with means connecting opposite ends of the rest to opposite ends of the frame so as to provide a unitary, compact, and rigid structure permitting quick and easy adjustment of the rest relative to the frame so as to vary either the depth or the angularity of the cut to be made.

Another object is to provide in a tool of the character set forth improved means for connecting the opposite ends of the rest to the guard frame, including conveniently arranged clamping devices for holding the parts in any desired adjusted relation.

Still another object is to provide a tool of the character set forth in which the main guard frame protects the user from the upper peripheral portion of the saw blade and an auxiliary guard affords protection from the lower peripheral portion of the blade, the arrangement being such that both guards are equally effective in all positions of adjustment.

Another object is to provide in a portable power driven saw having a main guard frame and a guide rest associated therewith in the manner generally set forth above, a construction which is simple, inexpensive, relatively light in weight, and otherwise thoroughly practical.

The objects of the invention thus set forth, together with other and ancillary advantages are attained by the construction and arrangement illustrated in the accompanying drawings forming part hereof, the preferred embodiment only of the invention being illustrated and hereinafter described. Certain generic features of the invention as herein set forth and claimed are disclosed in my co-pending application Serial No. 175,652, filed March 16, 1927, of which this application is a continuation in part.

In the accompanying drawings:

Fig. 3 is a perspectve view of the main frame and guide rest with associated parts, detached from the support.

Fig. 4 is a fragmentary view looking from the rear end of the main frame and guide rest.

Fig. 5 is a fragmentary view illustrating the connection between the forward ends of the guide rest and frame, the view being taken from the side opposite that shown in Figs. 1 and 3.

Figure 1:
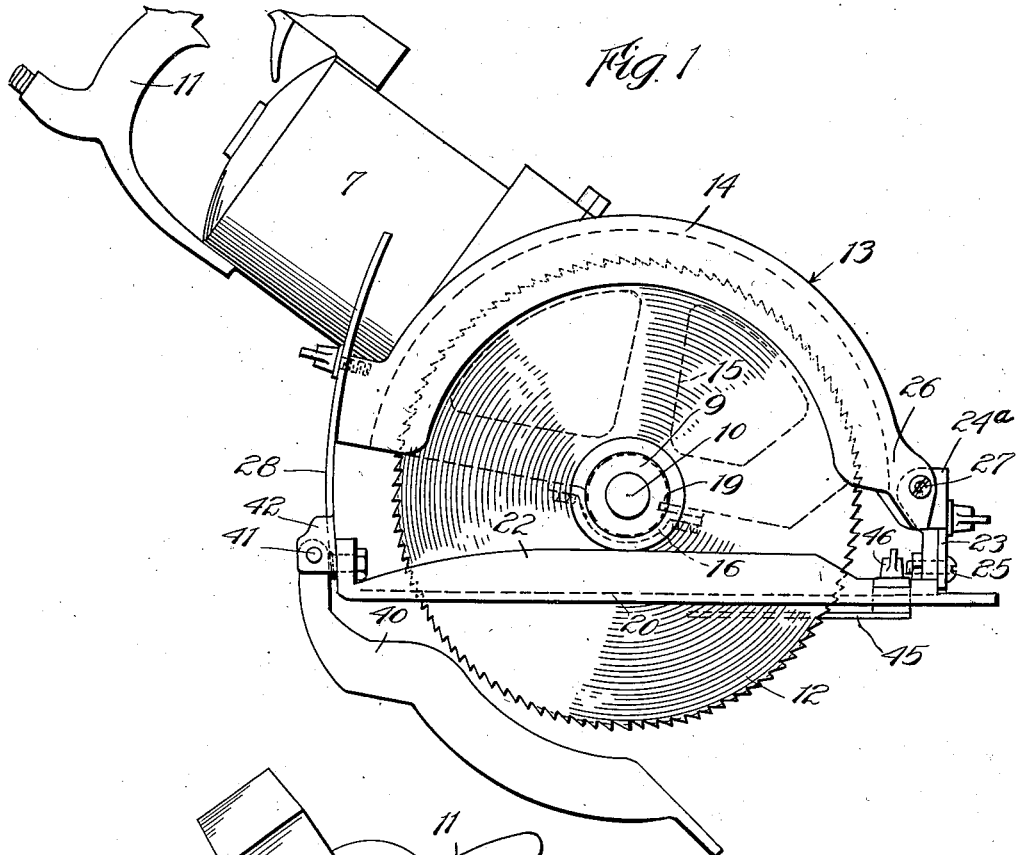
Figure 1 is a fragmentary side elevational view of a portable power driven saw embodying the invention.
Figure 2:
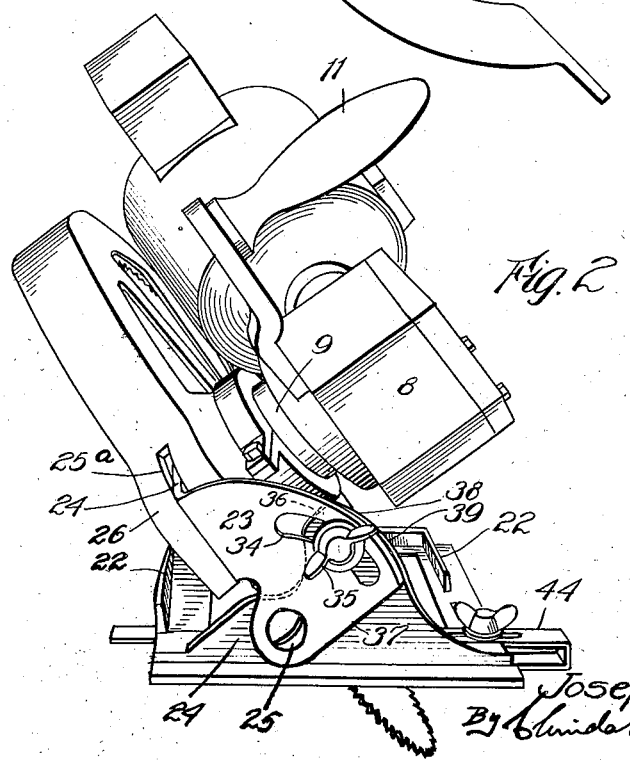
Fig. 2 is an end view of the saw showing the guide rest adjusted angularly for the purpose of making a miter cut.

Portable power driven tools of the class to which this invention relates customarily embody an electric motor rigidly associated with and forming a part of the saw structure. In the embodiment illustrated, 7 designates the casing of an electric motor whose shaft (not shown) extends forwardly into a gear box 8 (Fig. 2) the latter having at one side a cylindrical bearing 9 through which extends a tool spindle or arbor 10. Suitable handles 11 are provided on the motor casing and associated structure in the usual manner so that the tool can be manipulated readily on the right hand side of the operator.

The tool spindle 10 has in the present instance a circular saw blade 12 secured thereto, and on the cylindrical bearing 9 is mounted an approximately semicircular frame 13 overlying the upper peripheral portion of the blade 12 and constituting the main guard therefor.

The frame 13 comprises an arcuate peripheral member 14 substantially U-shaped in cross section so as to form a channel to receive the upper periphery of the saw blade. From one wall of the channel member 14 a plurality of arms 15 project approximately radially, and at their centers they form with a cap plate 16 a clamp adapted to receive the cylindrical bearing 9 for the spindle 10. Two of the arms 15 are alined with each other, and the cap plate 16 is secured to the under side of the respective arms, by means of bolts 17. A flat plate 18 is interposed between one end of the cap plate and the adjacent arm 15, the end of the plate projecting into the opening to form a lug which is adapted to be entered in a groove 19 in the periphery of the cylindrical bearing 9, whereby to hold the guard frame against rotation.

To guide the saw relative to the work, a shoe or guide rest 20 is provided. This rest is in the form of an elongated plate of a length substantially greater than the diameter of the saw blade and having a central longitudinal slot 21 of substantial width through which the lower portion of the blade projects. The plate forming the guide rest is made relatively thin, and preferably of light material, such as aluminum. For the sake of stiffness the upper surface of the plate is provided with reinforcing ribs 22.

The forward end of the guide rest, that is to say, the end remote from the handle 11 is connected to the forward end of the frame 13 by means of a link 23 (Fig. 2) in the form of a segmental plate. Said link is pivotally secured at its lower end to an upstanding lug 24 through the medium of a pivot bolt 25. The latter provides a pivotal axis for the link which is disposed substantially in the plane of the saw blade, longitudinally of the rest. The upper end of the link has a rearwardly bent lug 24ª which is received within a slot 25ª in a forwardly projecting portion 26 of the main guard frame. A screw 27 provides a pivotal connection between the upper end of the link and the frame 13, the axis of said screw extending in a direction perpendicular to the plane of the saw blade.

The rear end of the guide rest is connected with the rear end of the frame 13 by means also including a link 28, this latter link being in the form of an elongated slightly curved plate (Figs. 3 and 4). At its lower end the link 28 is pivotally secured to an upstanding lug 29 on the rear end of the guide rest 20 by means of a bolt 30, the head of the bolt being countersunk in the lower rear face of the link. This pivot bolt 30, like the pivot bolt 25 at the forward end of the rest, is disposed on an axis substantially in the plane of the saw blade. Above the point of connection with the guide rest the link plate 28 has a slidable connection with the rear end of the frame 13. Thus in the present instance, the link is longitudinally slotted as indicated at 31 to receive a clamping screw 32 anchored in a rearwardly projecting portion 33 of the arcuate frame member 14. For convenience the clamping screw 32 has a wing nut head; and to hold the frame from turning relative to the link, one or more pins 33ª project from the part 33 into the slot.

It will be observed that by manipulating the screw 32 the position of the guide rest 20 relative to the frame 13 may be readily changed and locked in various positions to vary the depth of the cut to be made. Also it will be seen that by reason of the longitudinally disposed pivots 25 and 30 at the opposite ends of the guide rest the latter may be adjusted to various angular positions with respect to the saw blade so that miter cuts of any desired degree might be made.

In order to be able to lock the guide rest in a desired position of angular adjustment, the forward link plate 23 has an arcuate slot 34 therein struck on the radius of the pivot bolt 25, and a clamping screw 35 is entered through this slot and anchored in an upward extension 36 of the lug 24, said extension being offset to one side of the bolt 25.

In making an angular adjustment for the purpose of a miter cut, it is desirable that the guard 13 be capable of movement in one direction only relative to the guide rest, and that in a direction to the right of the operator when the guide rest is flat upon a horizontal piece of work. To this end the forward segmental link plate 23 has a lower straight edge 37 which is adapted to engage with the upper surface of the rest forwardly of the lug 24 when the saw blade is in position to make a true ninety degree angle cut. One advantage in this arrangement is that in restoring the parts to the normal ninety degree relationship from a smaller angular relationship, it is only necessary to loosen the clamping screw 35 and swing the guard 13 until the straight edge 37 of the link 23 strikes the guide rest. For other adjustments reference may be had to a scale 38 formed on the peripheral edge of the segmental link plate 23, there being a coacting point 39 on the edge of the adjacent lug extension 36.

It will be observed that each adjustment is accomplished by the manipulation of a single clamping screw, and the adjustment which is most frequently used, namely the depth adjustment, is made through the medium of the conveniently located rearmost screw 32. Moreover, it will be seen that in whatever relation the parts may occupy they may be firmly secured together in a rigid structure.

In view of the relatively fixed relation between the main guard frame 13 and the tool spindle 10, the frame remains at all times in operative protective relation to the saw blade irrespective of the various adjustments which may be made. Also it will be observed that the rear link 28 constitutes a downward continuation of the rear end of the frame 13 when the guide rest is positioned remote from the frame. Thus the link 28 additionally serves to protect the user from the rapidly revolving blade.

In order to protect the operator from the lower exposed portion of the blade, especially when carrying the saw about from place to place, a lower auxiliary guard member 40 is provided. This member, like the arcuate member 14 of the upper frame is U-shaped in cross section and is pivotally mounted at its upper end so that it shall always be operative to protect the operator regardless of the angular position of the rest relative to the blade. To this end the pivotal connection for the guard 40 comprises a pin 41 mounted in two spaced lugs 42 bent rearwardly from the lower end of the link plate 28, the upper end of the guard member having a portion 43 fitting snugly between the two lugs 42 and apertured to receive the pin. Thus the auxiliary guard 40 is pivotally suspended from the main guard frame 13 through the medium of the link 28. In the use of the saw the auxiliary guard member 40 occupies a trailing position above the surface of the work and in carrying the saw about from place to place this guard member swings downwardly by gravity into protecting relation to the saw blade.

For the purpose of providing a straight edge for facilitating the operator in guiding the saw on a line parallel to the work being operated upon, I provide a transversely adjustable arm 44 at the forward end of the guide rest rearwardly of the lug 24. This arm 44 is slotted longitudinally of its length and at the left hand end thereof it is reversely bent (Fig. 2) so as to underlie the left hand edge of the guide rest as viewed from the operator's position. This reversely bent portion of the arm 44 carries at right angles thereto a plate 45. The slotted arm 44 may be adjusted in the desired position transversely of the guide rest by means of a clamping screw 46, the arm being mounted in grooved ways 47 formed in the upper surface of the guide rest.

It will be apparent that provision has been made both for depth and mitering adjustments of the saw through the medium of a novel arrangement of independent links interposed between the extreme ends of the arcuate guard 13 and opposite ends of the single guide rest 20. The construction promotes substantial rigidity, and at the same time a maximum degree of vertical as well as angular adjustment of the rest is permitted. The open construction of the guard frame exposes to the view of the operator a large area of the work being operated upon and makes for extreme lightness in construction, safety in operation, and ease in handling, owing to the proper balance obtained.

I claim as my invention:

A portable power driven saw comprising, in combination with a driven shaft having a saw blade mounted thereon, a rigid frame structure comprising a fixed arcuate guard member overlying the upper portion of the saw blade, a guide rest in the form of an elongated plate of a length greater than the diameter of the saw blade and having a central longitudinal slot through which the lower portion of the blade may project, and means for securing the opposite ends of said rest to the frame structure at opposite ends of said guard member comprising two upstanding lugs on the rest one near each end thereof, link members respectively connecting said lugs to the frame structure, the connection between the link members and the lugs being adapted to permit of an angular tilting adjustment of the rest relative to the guard member on an axis extending longitudinally of the rest, and an auxiliary guard member pivoted to one of said link members and therefore maintaining its capacity to swing into guarding relation to the saw blade irrespective of the angular position of the rest with respect to the blade.

In testimony whereof, I have hereunto affixed my signature.

JOSEPH F. HAAS.